(12) United States Patent
Hsieh et al.

(10) Patent No.: US 8,411,916 B2
(45) Date of Patent: Apr. 2, 2013

(54) BIO-READER DEVICE WITH TICKET IDENTIFICATION

(75) Inventors: Ming Hsieh, So. Pasadena, CA (US); Songtao Li, Arcadia, CA (US)

(73) Assignee: 3M Cogent, Inc., Pasadena, CA (US)

( * ) Notice: Subject to any disclaimer, the term of this patent is extended or adjusted under 35 U.S.C. 154(b) by 1313 days.

(21) Appl. No.: 12/058,310

(22) Filed: Mar. 28, 2008

(65) Prior Publication Data

US 2008/0304723 A1 Dec. 11, 2008

Related U.S. Application Data

(60) Provisional application No. 60/943,139, filed on Jun. 11, 2007.

(51) Int. Cl.
*G06K 9/00* (2006.01)

(52) U.S. Cl. .......................................... 382/128

(58) Field of Classification Search .......... None
See application file for complete search history.

(56) References Cited

U.S. PATENT DOCUMENTS

| | | |
|---|---|---|
| 4,137,565 A | 1/1979 | Mager et al. |
| 4,315,310 A | 2/1982 | Bayliss et al. |
| 4,784,484 A | 11/1988 | Jensen |
| 4,832,485 A | 5/1989 | Bowles |
| 4,833,724 A | 5/1989 | Goel |
| 5,245,672 A | 9/1993 | Wilson et al. |
| 5,307,345 A | 4/1994 | Lozowick et al. |
| 5,426,684 A | 6/1995 | Gaborski et al. |
| 5,517,419 A | 5/1996 | Lanckton et al. |
| 5,528,355 A | 6/1996 | Maase et al. |
| 5,579,278 A | 11/1996 | McLaury |
| 5,613,014 A | 3/1997 | Eshera et al. |
| 5,633,947 A | 5/1997 | Sibbald |
| 5,751,836 A | 5/1998 | Wildes et al. |
| 5,754,697 A | 5/1998 | Fu et al. |
| 5,778,175 A | 7/1998 | Paul et al. |
| 5,809,180 A | 9/1998 | Kimura et al. |
| 5,828,769 A | 10/1998 | Burns |
| 5,887,079 A | 3/1999 | Endo et al. |
| 5,900,993 A | 5/1999 | Betensky |
| 5,937,090 A | 8/1999 | Kim |
| 5,949,905 A | 9/1999 | Nichani et al. |
| 6,002,815 A | 12/1999 | Immega et al. |
| 6,038,226 A | 3/2000 | Ellersick et al. |

(Continued)

FOREIGN PATENT DOCUMENTS

| | | |
|---|---|---|
| EP | 0 098 607 | 7/1983 |
| WO | WO 96/13742 | 5/1996 |

(Continued)

OTHER PUBLICATIONS

U.S. Appl. No. 60/357,557, entitled "Automatic Dredge System and Method of Operation," filed Feb. 15, 2002.

(Continued)

*Primary Examiner* — Jermele M Hollington

(57) ABSTRACT

A method and device for determining a concentration of a biological target. The method and device include: capturing an image of a ticket including the biological target and information about the ticket; selecting pre-determined data corresponding to the ticket and the target responsive to the read information about the ticket; and determining the concentration of the biological target according to the pre-determined data. The method and device may further comprise selecting calibration data corresponding to the ticket, responsive to the read information about the ticket; and determining the concentration of the biological target according to the pre-determined data and the calibration data.

20 Claims, 4 Drawing Sheets

U.S. PATENT DOCUMENTS

| | | | |
|---|---|---|---|
| 6,043,900 A | 3/2000 | Feng et al. | |
| 6,175,407 B1 | 1/2001 | Sartor | |
| 6,219,447 B1 | 4/2001 | Lee | |
| 6,249,360 B1 | 6/2001 | Pollard et al. | |
| 6,259,108 B1 | 7/2001 | Antonelli et al. | |
| 6,324,020 B1 | 11/2001 | Teng et al. | |
| 6,355,937 B2 | 3/2002 | Antonelli et al. | |
| 6,360,307 B1 | 3/2002 | Raftery et al. | |
| 6,384,832 B1 | 5/2002 | Muramatsu et al. | |
| 6,473,194 B1 | 10/2002 | Sakai | |
| 6,483,932 B1 | 11/2002 | Martinez et al. | |
| 6,618,076 B1 | 9/2003 | Sikthankar et al. | |
| 6,654,142 B1 | 11/2003 | Min | |
| 6,697,538 B1 | 2/2004 | Angenent et al. | |
| 6,879,709 B2 | 4/2005 | Tian et al. | |
| 6,928,195 B2 | 8/2005 | Scott et al. | |
| 6,993,165 B2 | 1/2006 | McClurg et al. | |
| 7,020,951 B2 | 4/2006 | Lin et al. | |
| 7,081,951 B2 | 7/2006 | Carver et al. | |
| 7,088,872 B1 | 8/2006 | Hsieh et al. | |
| 7,095,880 B2 | 8/2006 | Martinez et al. | |
| 7,194,393 B2 | 3/2007 | Wei et al. | |
| 7,203,344 B2 | 4/2007 | McClurg et al. | |
| 7,267,799 B1 | 9/2007 | Borich et al. | |
| 7,277,562 B2 | 10/2007 | Zyzdryn | |
| 7,430,303 B2* | 9/2008 | Sefcik et al. | 382/103 |
| 7,580,567 B2 | 8/2009 | Hsieh et al. | |
| 7,587,064 B2 | 9/2009 | Owechko et al. | |
| 7,616,788 B2 | 11/2009 | Hsieh et al. | |
| 7,639,858 B2 | 12/2009 | Ross et al. | |
| 7,796,266 B2 | 9/2010 | Cohen et al. | |
| 7,840,062 B2 | 11/2010 | Boroczky et al. | |
| 7,876,934 B2 | 1/2011 | Georgescu et al. | |
| 8,131,477 B2* | 3/2012 | Li et al. | 382/282 |
| 2001/0038707 A1 | 11/2001 | Ohara | |
| 2002/0073211 A1 | 6/2002 | Lin et al. | |
| 2003/0013951 A1 | 1/2003 | Stefanescu et al. | |
| 2003/0025749 A1 | 2/2003 | Krouss | |
| 2003/0185420 A1* | 10/2003 | Sefcik et al. | 382/103 |
| 2003/0189571 A1 | 10/2003 | Macinnis et al. | |
| 2004/0046761 A1 | 3/2004 | Hellman et al. | |
| 2004/0102931 A1 | 5/2004 | Ellis et al. | |
| 2004/0114829 A1 | 6/2004 | LeFeuvre et al. | |
| 2005/0020903 A1 | 1/2005 | Krishnan et al. | |
| 2006/0019265 A1* | 1/2006 | Song et al. | 435/6 |
| 2006/0224539 A1 | 10/2006 | Zhang et al. | |
| 2006/0245631 A1 | 11/2006 | Levenson et al. | |
| 2007/0112525 A1* | 5/2007 | Li et al. | 702/19 |
| 2007/0140550 A1 | 6/2007 | Li et al. | |
| 2007/0183663 A1 | 8/2007 | Wang et al. | |
| 2007/0189582 A1 | 8/2007 | Hamza et al. | |
| 2007/0296863 A1 | 12/2007 | Hwang et al. | |
| 2008/0080768 A1 | 4/2008 | Li et al. | |
| 2008/0123931 A1 | 5/2008 | He et al. | |
| 2008/0159614 A1 | 7/2008 | He et al. | |
| 2008/0170778 A1 | 7/2008 | Luo | |
| 2008/0292194 A1 | 11/2008 | Schmidt et al. | |
| 2009/0060335 A1 | 3/2009 | Rodriguez | |
| 2009/0116737 A1 | 5/2009 | Kiraly et al. | |
| 2009/0154814 A1 | 6/2009 | Natan | |
| 2009/0161928 A1 | 6/2009 | Khamene et al. | |
| 2009/0171240 A1 | 7/2009 | Aguilar et al. | |
| 2009/0185746 A1 | 7/2009 | Mian et al. | |
| 2009/0220148 A1 | 9/2009 | Levy et al. | |
| 2009/0268988 A1 | 10/2009 | Hsieh et al. | |
| 2010/0014718 A1 | 1/2010 | Savvides et al. | |
| 2010/0027852 A1 | 2/2010 | Hsieh et al. | |
| 2010/0049674 A1 | 2/2010 | Zohar et al. | |
| 2010/0178204 A1 | 7/2010 | Yin et al. | |
| 2010/0253337 A1* | 10/2010 | Tseng et al. | 324/309 |
| 2010/0304358 A1* | 12/2010 | Nie et al. | 250/458.1 |
| 2012/0120233 A1* | 5/2012 | Li et al. | 348/135 |

FOREIGN PATENT DOCUMENTS

| | | |
|---|---|---|
| WO | WO 01/18741 | 3/2001 |
| WO | WO 2008/024778 | 2/2008 |

OTHER PUBLICATIONS

U.S. Appl. No. 60/915,363, entitled "Apparatus for Capturing a High Quality Image of a Moisten Finger," filed May 1, 2007.

Seul, Michael et al., "Practical Algorithms for Image Analysis," Cambridge University Press 2000, pp. 1-13.

Vincent, Luc, "Morphological Grayscale Reconstruction in Image Analysis: Applications and Efficient Algorithms," Transactions on Image Processing, vol. 2, No. 2, Apr. 1993, pp. 176-201.

Carlson, M.A., et al., "An Automated, Handheld Biosensor for Aflatoxin," Biosensors & Electronics 14 (2000), pp. 841-848.

Delmulle, Barbara S., et al., Development of an Immunoassay-Based Lateral Flow Dipstick for the Rapid Detection of Aflatoxin $B_1$ in Pig Feed, Journal of Agricultural and Food Chemistry, J. Agric. Food Chem. 2005, 53, pp. 3364-3368.

Tahir-Muhammad, Zarini, et al. "A Conductometric Biosensor for Biosecurity," Biosensors & Bioelectronics, Biosensors and Bioelectronics 18 (2003) pp. 813-819.

Niedbala, R. Sam, et al. "Detection of Analytes by Ummunoassay Using Up-Converting Phosphor Technology," Anal. Biochem. (2001), vol. 293, pp. 22-30.

* cited by examiner

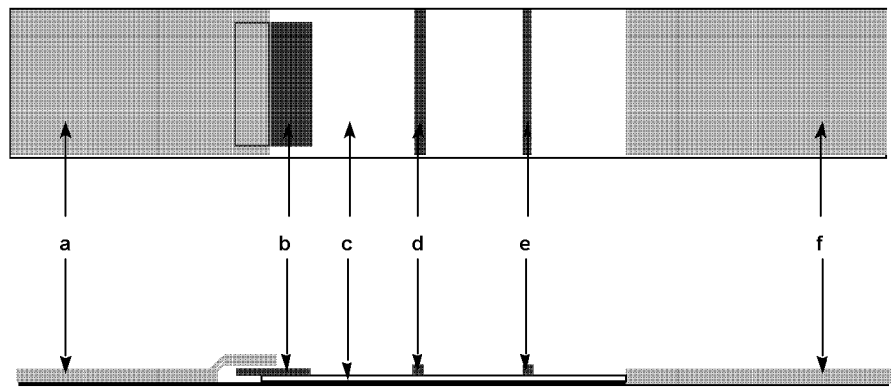
FIG. 1A
FIG. 1B
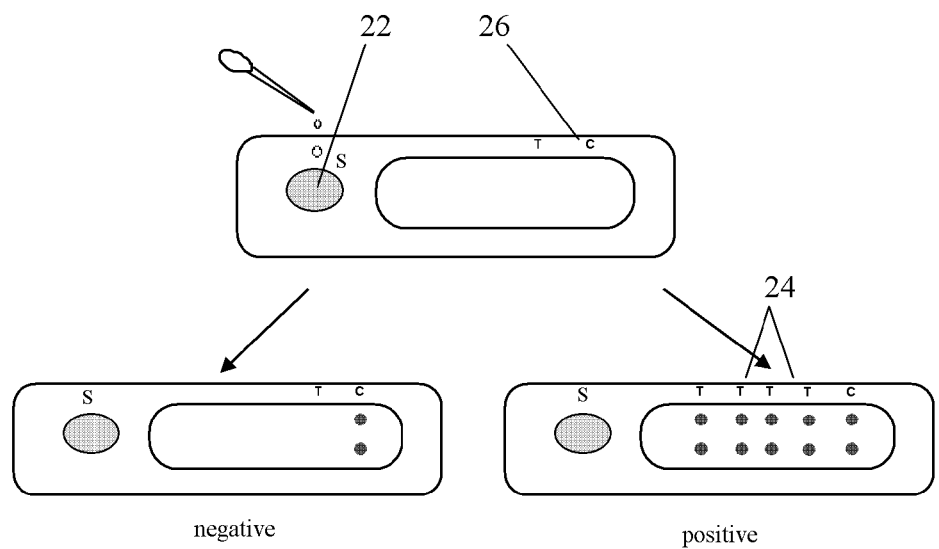
FIG. 2

BIO-READER DEVICE WITH TICKET IDENTIFICATION

CROSS-REFERENCE TO RELATED APPLICATION

This patent application claims the benefits of U.S. Provisional Patent Application Ser. No. 60/943,139, filed on Jun. 11, 2007 and entitled "Bio-Reader Device With Barcode," the entire content of which is hereby expressly incorporated by reference. This patent application is also related to the commonly owned pending U.S. patent application Ser. No. 11/501,377, filed on Aug. 8, 2006 and entitled "System and Method for Image-Based Biological Data Quantification," the entire content of which is hereby expressly incorporated by reference.

FIELD OF THE INVENTION

The present invention relates generally to a device for biological data quantification; and more particularly to a portable biological data quantification device with ticket identification capability.

BACKGROUND OF THE INVENTION

Systems and devices for quantitative detections of biological data applications typically use a ticket, on which a target under test is placed. In the applications of drug discovery, medicine research and disease diagnostics, the detection targets include, but are not limited to, various cykotines such as Vascular Cell Adhesion Molecule-1 (VCAM-1), Interferon-γ (IFN-γ), Interleukin-6 (IL-6), and Interleukin-10 (IL-10) in human plasma, blood, urine and other body fluids. In the applications of bio-defense, the detection targets include, but are not limited to, various biological agents such as vaccinia, ricin, botulinum toxin and B. anthrax spores in water.

FIGS. 1A and 1B respectively illustrate top view and a side view of a lateral flow-based immunoassay ticket configuration. An adsorbent pad (a) receives a sample target and a conjugate release pad (b) includes a conjugate comprising of gold and antibody embedded therein. The sample passes through the conjugate release pad (b) and flows on a membrane (c) by a capillary flow. A zone (d) contains captured antibody (testing line), where antibody-antigen-antibody-gold complex (sandwich) is formed. A zone (e) contains control antibody where a control line is formed through direct antibody against another anti-species antibody. A receiving pad (f) receives liquid from the membrane (c).

FIG. 2 is an illustration of positive and negative immunoassay tickets. The assay includes four components: a capture antibody, an antigen, a detector antibody for binding the target, and a labeled reporter molecule of interest which binds to the detector antibody. The sample liquid is added into one or more sample well 22, also denoted as "S". The control points or lines determine if the ticket itself is a functional ticket. In other words, if the control lines/points do not appear, the ticket is a bad ticket, regardless of the sample. For negative sample results, only control points or lines appear in the control zone 26, also denoted as "C". For positive sample results, in addition to the control points or lines, there are target points or lines appearing in the target zone/area 24, also denoted as "T". The ticket window area in FIG. 2 is the inner rectangle that includes the control zone/area and the target zone/area.

The reporter can be an enzyme, a fluorophore, a colored particle, a dyed particle, a particle containing a dye, a stained particle, a radioactive label, quantum dots, nanocrystals, up-converting phosphorescent particles, metal sols, fluorophore or dye containing polymer or latex beads that are detectable visually and/or with mechanical assistance and the like.

Because there are manufacturing variations among different ticket lots, the reader needs to be calibrated (compensated) for the manufacturing variations. The calibration needs to be in accordance with the specific ticket lot to be more effective Therefore, there is a need for an accurate image-based biological data quantification device with ticket calibration capability.

SUMMARY OF THE INVENTION

In some embodiment, the present invention is a method for determining a concentration of a biological target. The method includes: capturing an image of a ticket including the biological target and information about the ticket; selecting pre-determined data corresponding to the ticket and the target responsive to the read information about the ticket; and determining the concentration of the biological target according to the pre-determined data. The method may further comprise selecting calibration data corresponding to the ticket, responsive to the read information about the ticket; and determining the concentration of the biological target according to the pre-determined data and the calibration data.

In some embodiment, the present invention is a device (reader) for determining a concentration of a biological target. The Device includes: an optical module for capturing an image of a ticket including the biological target and information about the ticket; a sensor for converting the captured image to digital data; and a processor for processing the digital data, selecting pre-determined data corresponding to the ticket and the target responsive to the read information about the ticket, and determining the concentration of the biological target according to the pre-determined data.

The predetermine data may be a curve or a look up table stored in a memory.

BRIEF DESCRIPTION OF THE DRAWINGS

FIGS. 1A and 1B respectively illustrate top view and a side view of a lateral flow-based immunoassay ticket configuration;

FIG. 2 is an illustration of positive and negative immunoassay tickets, according to some embodiments of the present invention;

DETAIL DESCRIPTION

In some embodiments, the present invention is a quantification reader device for biological and biochemical detection applications.

Figure 3:
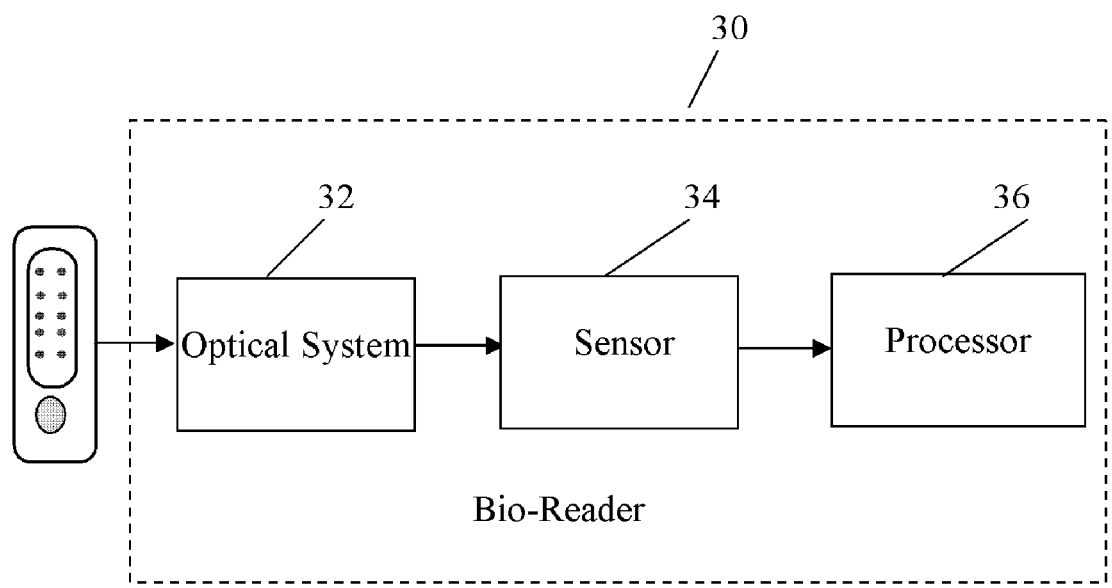
FIG. 3 depicts an exemplary hardware block diagram of a bio-reader, according to some embodiments of the present invention.

FIG. 3 depicts an exemplary hardware block diagram of a bio-reader 30 and ticket 2, according to some embodiments of the present invention. As shown, the bio-reader 30 includes three main parts: an optical module 32, a sensor 34, and a processor 36. The optical module 32 is capable of capturing clear and sharp images in the assay tickets. The sensor 34, for example a CMOS sensor, converts the captured image to digital data to be processed by the processor. The processor 36 includes an image binarization module 10, a scanning module 12, and an information decoding module 14. The bio-reader 30 also includes a memory 4 and a display 6.

In some embodiments, for the requirements of sensitive detection and precise quantification, the device (reader) is designed based on an optical camera to capture clear and high resolution ticket images and analyze the assay results. The analysis process can detect both qualitative and quantitative results. In the quantitative analysis, the target concentration is determined from the computed image intensity value via a quantitative corresponding curve. For precise quantitative requirement, the corresponding curve is uniquely generated for each group of tickets based on detected target and applied sample liquid. Because manufacturing variation among different ticket lots, some calibration information is generated along with each ticket lot to calibrate (compensate) the reader for the manufacturing variation. Each barcode such as, a 6 digit barcode 050001, includes an index for each ticket lot. The quantitative corresponding curves for the ticket targets are then loaded from reader's memory (e.g., a flash memory), based on the barcode index number. The barcode may also include an index number to point to calibration information stored in a memory in the device. For chemical reasons, different ticket lots that are manufactured in different time may have various reader responses. Therefore, calibration information, for example, a look-up table including a group of calibration coefficients is saved in device's memory. The device can then obtain corresponding calibration coefficients based on the barcode index number for different ticket lots.

According to some embodiments of the present invention, the bio-reader uses an automated ticket information input method to read information specific to the ticket, ticket lot, and/or the target. For each group of tickets, a one (or two) dimensional barcode is printed along one or more sides of the ticket window. Within one camera shot, both the ticket window image and the barcode image are captured. An image processing and analysis algorithm then decodes the barcode information. The appropriate corresponding curve and related calibration information is then loaded from a candidate pool by using the barcode as an index.

Figure 7:
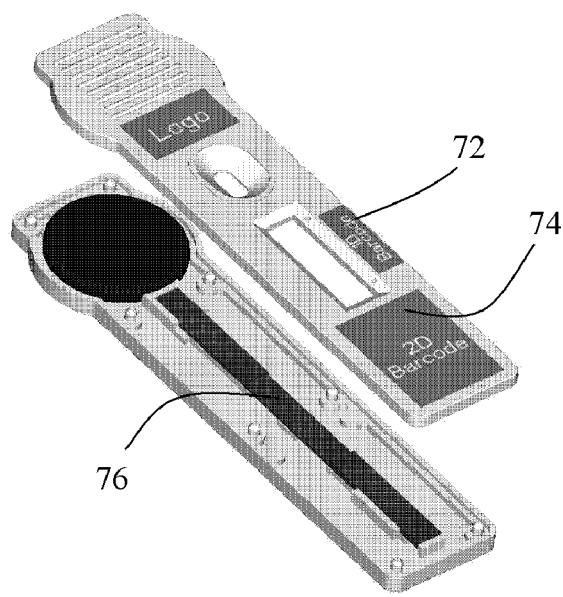
FIG. 7 shows an exemplary ticket design with a one dimensional barcode, a two dimensional barcode and a RFID chip, according to some embodiments of the present invention.
Figure 8:
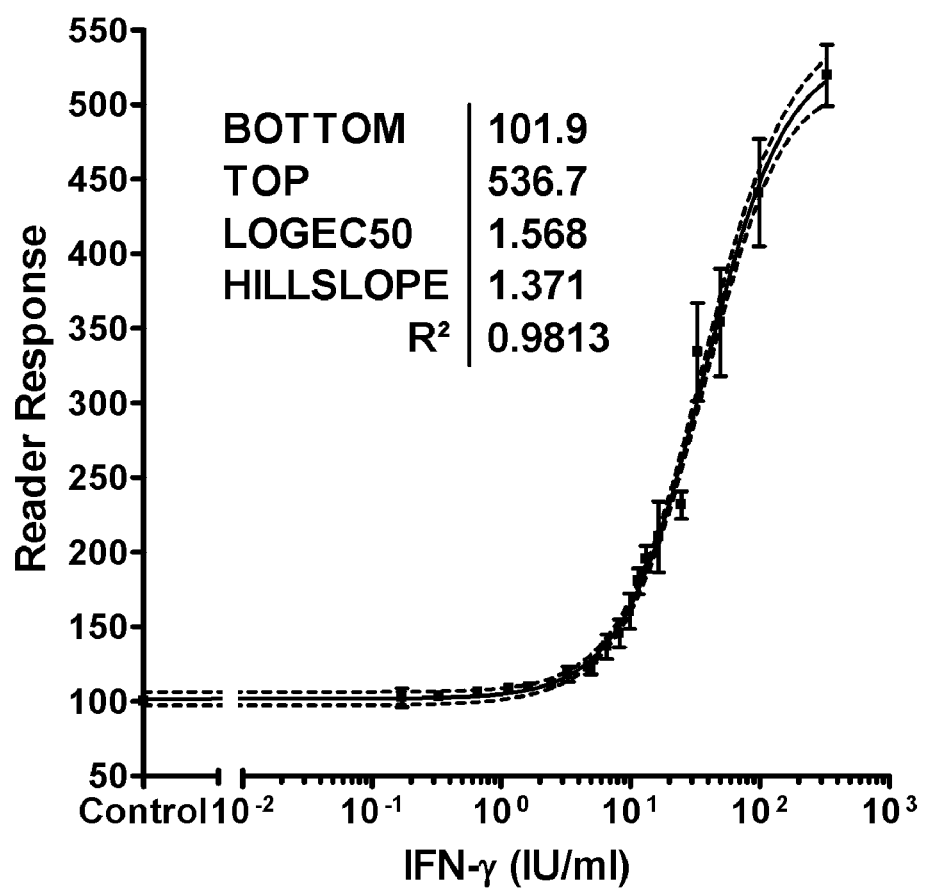
FIG. 8 illustrates an exemplary curve corresponding to a (IFN-γ) target depicting four parameter, according to some embodiments of the invention.

FIG. 7 illustrates an exemplary (quantitative) curve corresponding to a (IFN-γ) target depicting four parameter, according to some embodiments of the invention. The curve is described as a four parameter logistic equation:

$$Y=Bottom+(Top-Bottom)/(1+10\hat{\ }((LogEC50-X)*HillSlope)),$$

Where X is the Log of target concentration, and Y is the reader response. Y starts at Bottom and goes to Top with a sigmoid shape. LogEC50 is the middle of the slope, and HillSlope is the variable for the slope of the curve. The four parameters are indexed to each target, for example, using a one or two-dimensional barcode, and saved in a memory in the device. Once the ticket reader reads the barcode index from the ticket, the appropriate parameters (curve) for the ticket are loaded for concentration calculation.

Figure 4:
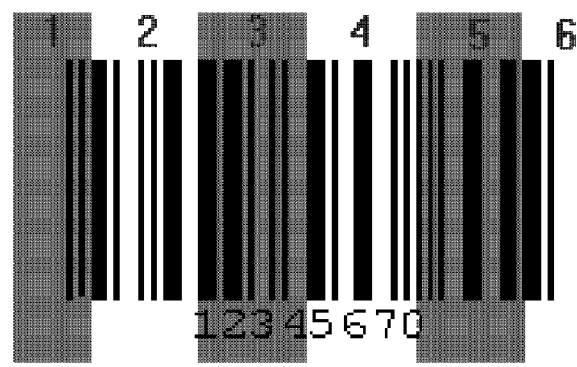
FIG. 4 shows an exemplary sample interleaved 2 of 5 barcode for 8 digits.

In one embodiment, a one dimensional barcode type, Interleaved 2 of 5, is selected. Interleaved 2 of 5 is a high-density numeric symbology. It encodes any even number of numeric characters in the widths (either narrow or wide) of the bars and spaces of the barcode. FIG. 4 shows an exemplary sample interleaved 2 of 5 barcode for 8 digits. The marked zone 1 on top of the barcode stands for the defined start character. Marked zone 6 stands for the stop character. The zones 2 to 5 are information encoding zones.

Figure 5:
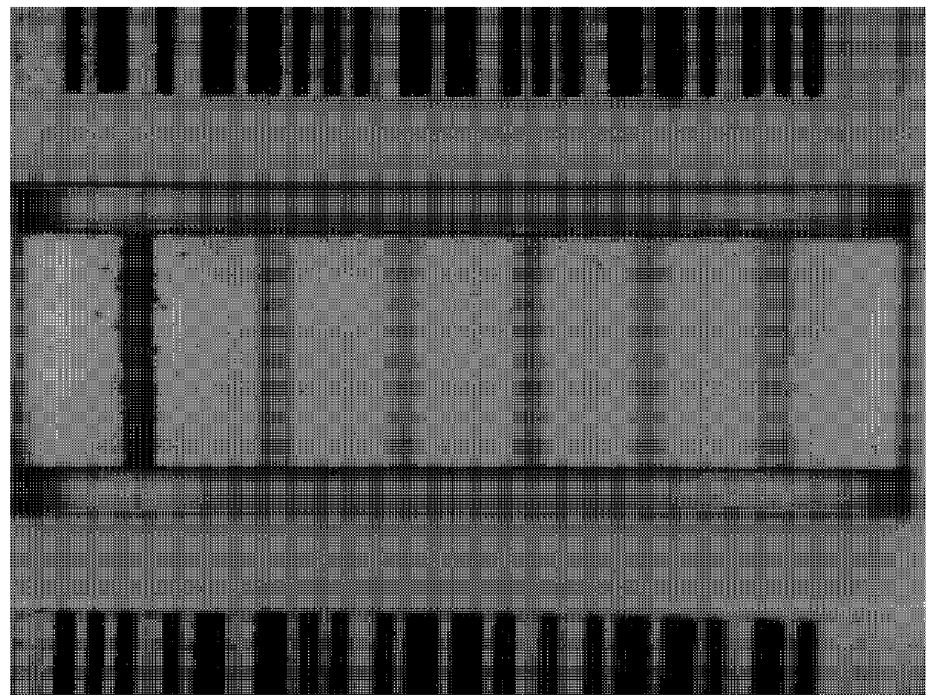
FIG. 5 shows an exemplary captured image with central ticket image and two side barcode, according to some embodiments of the present invention.

FIG. 5 shows an exemplary captured image with central ticket image and two side barcode, according to one embodiment of the present invention. In this example, the image size is 640 by 480 pixels with 256 grayscales. The barcode image quality may not be as good as the ideal ones. Image noise within the barcode images on the tickets could be generated by printing quality or scratching damage. An adaptive image processing and barcode decoding method is developed for this kind of poor quality barcode images.

The processing and decoding method includes three major modules: image binarization module, scanning module, and information decoding module.

In the image binarization module, the barcode image is cut from either top or bottom part of the original captured image. This module removes the noise affect and obtains a substantially clear black and white binary map. A statistic histogram of 256 grayscale, Hist(i), for the cut barcode image is obtained at first. Hist(i) stands for the pixel numbers with grayscale i within the image.

Figure 6A:
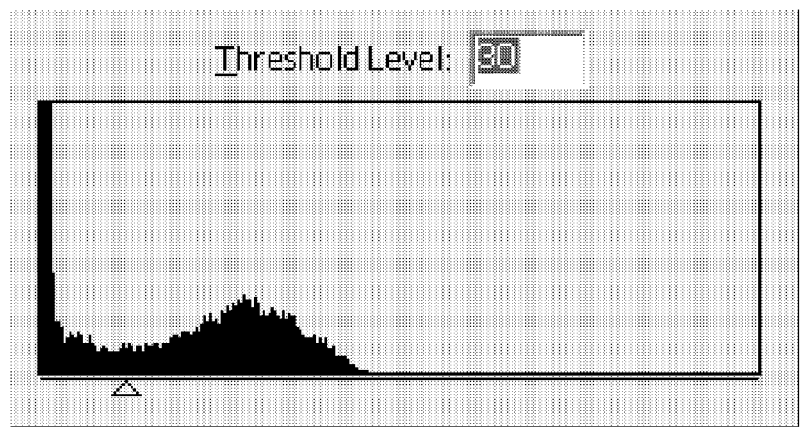
FIG. 6A depicts an exemplary histogram map and threshold selection, according to some embodiments of the present invention.

FIG. 6A depicts an exemplary histogram map and threshold selection, according to one embodiment of the present invention. Two peaks, Hist(i_low) and Hist(i_high), are found from the histogram map. Hist(i_low) stands for the average grayscale of dark bar area, and Hist(i_high) stands for the average grayscale of bright space area. The threshold, Th_bin, for binarization is obtained by:

$$\text{Th\_bin}=\text{Hist}(i\_low)+(\text{Hist}(i\_high)-\text{Hist}(i\_low))/3. \quad (1)$$

In some embodiments, the binary map is obtained by the following process:

(1) if the original pixel grayscale is larger than Th_bin, the binary value for this pixel is 255;

(2) if the original pixel grayscale is equal to or less than Th_bin, the binary value for the pixel is 0.

Figure 6B:
FIG. 6B shows a exemplary binary map corresponding to the histogram map of FIG. 6A.

FIG. 6B shows a exemplary binary map corresponding to the histogram map of FIG. 6A. It shows the binary map result of the bottom barcode of FIG. 5.

The scanning module obtains the correct bar or space, and narrow or wide information about the bars and the spaces between them. The module horizontally scans a line through the entire barcode binary map. The continuous black area with 0 grayscale is computed for bar width by the module. The module then computes the continuous white area with 255 grayscale for the space width. Then, two average width values for bar and space are computed from the original bar and space widths as follow:

$$\text{Ave\_width\_bar}=\Sigma \text{Width\_bar}(i)/\text{Number\_bar\_All} \quad (2)$$

Where, Width_bar(i) is the width of the $i_{th}$ detected bar, and Number_bar_All is the total bar numbers.

Similarly, the Ave_width_space is obtained. The wide bar or space is defined as the width value which is larger than the average width, Ave_width_bar or Ave_width_space. The width value of the narrow bar or space is defined as equal to or less than the average widths. The validity of the scan is checked by verifying the start character and stop character. Three horizontal scanning operations with 10 pixels vertical distance between each scanning are applied to scan the barcode. Two groups of wide (W) or narrow (N) sign strings for both bar and space are generated only if at least two of the three scans have same result.

In the information decoding module, the numeric index information for each ticket lot is decoded based on the barcode encoding table, as shown in Table 1, below.

TABLE 1

| Numeric digit | Barcode encoding |
|---|---|
| 0 | NNWWN |
| 1 | WNNNW |
| 2 | NWNNW |
| 3 | WWNNN |
| 4 | NNWNW |
| 5 | WNWNN |
| 6 | NWWNN |
| 7 | NNNWW |
| 8 | WNNWN |
| 9 | NWNWN |

For more complex applications, other technologies with more storage capability such as two dimensional barcode, Digital signature, and RFID can be applied on or into the ticket. For example, in some embodiments, a one dimensional barcode may store an index to the corresponding curve and optionally, calibration information, stored in a memory of the device, while an RFID chip may store the curve itself and the calibration information.

FIG. 7 shows an exemplary ticket that integrates a one dimensional barcode 72, a two dimensional barcode 74, and a RFID chip 76. By integrating the one dimensional barcode 72, the two dimensional barcode 74, and the RFID chip 76, the bio-reader device can easily load the correct (appropriate) corresponding curve and calibration information for precise quantification analysis for biochemical and biological applications.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A method for determining a concentration of a biological target, the method comprising:
   capturing an image of a ticket including the biological target and information about the ticket;
   selecting pre-determined data corresponding to the ticket and the target responsive to the read information about the ticket; and
   determining the concentration of the biological target according to the pre-determined data.

2. The method of claim 1, further comprising selecting calibration data corresponding to the ticket, responsive to the read information about the ticket; and determining the concentration of the biological target according to the pre-determined data and the calibration data.

3. The method of claim 1, wherein the pre-determined data is a curve including concentration information about the target.

4. The method of claim 3, wherein the curve is described by the following equation:

$$Y = \text{Bottom} + (\text{Top} - \text{Bottom})/(1 + 10^{((\text{Log}EC50 - X) * \text{HillSlope})}),$$

where X is the Log of target concentration, Y is the reader response, Y starts at Bottom and goes to Top with a sigmoid shape, LogEC50 is middle of the slope of the curve, and HillSlope is a slope variable for the slope of the curve.

5. The method of claim 4, further comprising indexing Bottom, Top, LogEC50, and HillSlope parameters to each target, and saving the indexed data in a memory.

6. The method of claim 1, wherein the information about the ticket is stored in one or more of a one dimensional barcode and a two dimensional barcode.

7. The method of claim 1, wherein the information about the ticket is stored in a RFID chip.

8. The method of claim 1, wherein the pre-determined data is a look-up table stored in a memory.

9. The method of claim 1, further comprising displaying the concentration of the biological target.

10. The method of claim 1, further comprising:
    removing noise effects of the captured image of the information about the ticket;
    obtaining a black and white binary map of the captured image of the information about the ticket;
    scanning the binary map of the captured image;
    decoding the scanned binary map of the captured image; and
    selecting calibration data corresponding to the ticket, responsive to decoded binary map of the captured image.

11. A device for determining a concentration of a biological target comprising:
    an optical module for capturing an image of a ticket including the biological target and information about the ticket;
    a sensor for converting the captured image to digital data; and
    a processor for processing the digital data, selecting pre-determined data corresponding to the ticket and the target responsive to the read information about the ticket, and determining the concentration of the biological target according to the pre-determined data.

12. The device of claim 11, wherein the processor is configured to perform selecting calibration data corresponding to the ticket responsive to the read information about the ticket, and determining the concentration of the biological target according to the pre-determined data and the calibration data.

13. The device of claim 11, wherein the pre-determined data is a curve including concentration information about the target.

14. The device of claim 13, wherein the curve is represented by the following equation:

$$Y = \text{Bottom} + (\text{Top} - \text{Bottom})/(1 + 10^{((\text{Log}EC50 - X) * \text{HillSlope})}),$$

where X is the Log of target concentration, Y is the reader response, Y starts at Bottom and goes to Top with a sigmoid shape, LogEC50 is middle of the slope of the curve, and HillSlope is a slope variable for the slope of the curve.

15. The device of claim 14, further comprising means for indexing Bottom, Top, LogEC50, and HillSlope parameters to each target, and a memory for saving the indexed data.

16. The device of claim 11, further comprising one or more of a one dimensional barcode and a two dimensional barcode for storing the information about the ticket.

17. The device of claim 11, further comprising a RFID chip for storing the information about the ticket.

18. The device of claim 11, further comprising a memory, and wherein the pre-determined data is a look-up table stored in the memory.

19. The device of claim 11, further comprising a display for displaying the concentration of the biological target.

20. The device of claim 11, further comprising:
- an image binarization module for removing noise effects and obtaining a black and white binary map of the captured image of the information about the ticket;
- a scanning module for scanning the binary map of the captured image; and
- an information decoding module for decoding the scanned binary map of the captured image and selecting calibration data corresponding to the ticket, responsive to decoded binary map of the captured image.

* * * * *